(12) United States Patent
Naito et al.

(10) Patent No.: US 7,034,991 B2
(45) Date of Patent: Apr. 25, 2006

(54) OPTICAL AMPLIFICATION AND TRANSMISSION SYSTEM

(75) Inventors: Takao Naito, Kawasaki (JP); Toshiki Tanaka, Machida (JP)

(73) Assignee: Fujitsu Limited, Kawasaki (JP)

( * ) Notice: Subject to any disclaimer, the term of this patent is extended or adjusted under 35 U.S.C. 154(b) by 491 days.

(21) Appl. No.: 09/970,982

(22) Filed: Oct. 5, 2001

(65) Prior Publication Data
US 2002/0114061 A1     Aug. 22, 2002

(30) Foreign Application Priority Data
Dec. 22, 2000    (JP)   ............... 2000-391497

(51) Int. Cl.
*H01S 3/00*     (2006.01)
(52) U.S. Cl. ................................... 359/334
(58) Field of Classification Search ............... 359/334, 359/337, 337.4, 337.5; 372/3, 33
See application file for complete search history.

(56) References Cited

U.S. PATENT DOCUMENTS

| | | | |
|---|---|---|---|
| 5,887,093 A * | 3/1999 | Hansen et al. ............. | 385/27 |
| 6,011,892 A * | 1/2000 | Chraplyvy et al. ......... | 385/123 |
| 6,084,993 A | 7/2000 | Mukasa ..................... | 385/24 |
| 6,404,964 B1 * | 6/2002 | Bhagavatula et al. ....... | 385/123 |
| 6,430,347 B1 * | 8/2002 | Cain et al. .................. | 385/123 |
| 6,671,445 B1 * | 12/2003 | Bickham et al. ............ | 385/127 |
| 2001/0053263 A1 * | 12/2001 | Watanabe ................... | 385/24 |
| 2002/0034357 A1 * | 3/2002 | Desthieux et al. .......... | 385/24 |
| 2002/0041747 A1 * | 4/2002 | Italo et al. ................... | 385/123 |
| 2002/0090187 A1 * | 7/2002 | Italso et al. ................. | 385/127 |
| 2002/0121132 A1 * | 9/2002 | Tanaka et al. .............. | 359/179 |

FOREIGN PATENT DOCUMENTS

EP     0790510 A2    8/1997
EP     1052746 A2    11/2000

OTHER PUBLICATIONS

Weik, Martin. Fiber Optics Standard Dictionary. 3rd Edition. 1997.*
Takao Naito, et al., "1 Terabit/s WDM Transmission over 10,000 km", 25th European Conference on Optical Communication, ECOC'99, Sep. 26, 1999, pp. 24-25.
French language Office Action and search report, dated Nov. 10, 2004, in corresponding French application 0116695000.

* cited by examiner

*Primary Examiner*—Deandra M. Hughes
(74) *Attorney, Agent, or Firm*—Staas & Halsey LLP

(57) ABSTRACT

An optical transmission line including first, second and third fibers so that an optical signal travels through the first, second and third fibers, in order. The first fiber has a positive dispersion for a wavelength of the optical signal. The second fiber has a negative dispersion for the wavelength of the optical signal and a mode field diameter smaller than a mode field diameter of the first fiber. The third fiber has a mode field diameter smaller than the mode field diameter of the second fiber. Pump light is provided to the third fiber so that Raman amplification occurs in the transmission line.

59 Claims, 13 Drawing Sheets

OPTICAL AMPLIFICATION AND TRANSMISSION SYSTEM

CROSS-REFERENCE TO RELATED APPLICATIONS

This application claims priority to Japanese application 2000-391497, filed Dec. 22, 2000, in Japan, and which is incorporated herein by reference.

BACKGROUND OF THE INVENTION

1. Field of the Invention

The present invention relates to an optical fiber transmission line for Raman amplification. More specifically, the present invention relates to a transmission line for Raman amplification and including a first fiber having a positive dispersion, a second fiber having a negative dispersion and a mode field diameter smaller than that of the first fiber, and a third fiber having a mode field diameter smaller than that of the second fiber.

2. Description of the Related Art

In long distance optical communication systems, an optical signal is transmitted through an optical transmission line. Moreover, wavelength division multiplexing (WDM) is currently being used in optical communication systems to increase transmission capacity. With WDM, two or more different wavelengths are multiplexed together and then transmitted together as a WDM optical signal through a single optical fiber as an optical transmission line.

Optical amplifiers are available which can amplify a WDM optical signal. Conventional optical communication systems typically combine the use of WDM and optical amplifiers to provide a high-capacity optical transmission system.

Moreover, optical regeneration repeaters are often positioned along the transmission line. An optical regeneration repeater converts the transmitted optical signal to an electric signal for retiming, reshaping and regenerating.

There are proposals to use an optical amplification repeater, which includes an optical amplifier, instead of using an optical regeneration repeater. By using an optical amplification repeater instead of an optical regeneration repeater, it is expected that the number of parts in the repeater can be significantly reduced, higher reliability can be achieved, and significant cost reduction can be realized.

FIG. 1 is a diagram illustrating a WDM optical communication system. Referring now to FIG. 1, an optical transmission station (OS) 1 includes a plurality of optical transmitters (E/O) 1A respectively outputting a plurality of optical signals of different wavelengths. The optical transmission station 1 also includes a multiplexer 1B wavelength multiplexing the plurality of optical signals together into a WDM optical signal, and a post amplifier 1C amplifying the WDM optical signal to a predetermined level and then outputting the amplified WDM optical signal to an optical transmission line 3.

An optical receiving station (OR) 2 receives the WDM optical signal from the transmission line 3. The optical receiving station 2 includes a pre-amplifier 2C amplifying the WDM optical signal. The optical receiving station 2 also includes a demultiplexer 2B demultiplexing the WDM optical signal into a plurality of optical signals depending on wavelength, and a plurality of optical receivers (O/E) 2A for respectively receiving the plurality of optical signals.

A plurality of optical repeaters 4 are arranged along the transmission line 3 at determined intervals. Each optical repeater 4 includes an optical amplifier for amplifying the WDM optical signal. In WDM optical communication systems, the optical amplifier is typically an erbium doped fiber amplifier (EDFA).

Raman amplification is also being used in WDM optical communication systems.

Moreover, optical communication systems have been proposed in which EDFAs are used in combination with Raman amplification, to thereby eliminate the use of optical regeneration repeaters.

With Raman amplification, a fiber is pumped with pump light in a manner which causes Raman amplification to occur in the fiber. Gain can be obtained in an inverse proportion to the mode field diameter of the fiber. Therefore, an optical fiber having a small mode field diameter is suitable for Raman amplification to provide a high gain.

For example, the mode field diameter of a negative dispersion fiber (−D fiber) having a 1.3 µm zero dispersion wavelength (referred to as a single mode fiber (SMF)) is about 5 mm. This mode field diameter is smaller than the mode field diameter of non-zero dispersion shifted fiber (referred to as a NZ-DSF), which is about 8 mm. Therefore, the SMF provides a relatively large Raman gain as compared to a NZ-DSF. See, for example, "Highly efficient distributed Raman amplification system in a zero-dispersion-flattened transmission line," H. Kawakami et al., ThB5, 0AA'99, 1999.

For realization of a high capacity long distance optical communication system, the problems to be solved include insufficient optical signal to noise ratio (OSNR) per wavelength and transmission waveform distortion due to non-linear effect.

The OSNR per wavelength can be improved by the use of a distributed gain Raman amplifier. This type of Raman amplifier will enable optical amplification for a WDM optical signal including wavelengths over a wide band.

However, the use of a distributed gain Raman amplifier can cause transmission waveform distortion due to non-linear effect. Therefore, it is important to consider the non-linear effect of an optical fiber used for Raman amplification.

It is also important to consider the wavelength dispersion of the optical fiber used for Raman amplification.

Further, it is important to consider the size of a Raman amplifier, with a smaller size generally being more desirable. Particularly, when a Raman amplifier is adapted to an optical transmitting terminal station or optical receiving terminal station, it is desirable to shorten the length of optical fiber and reduce the size of an optical fiber module of the amplifier.

SUMMARY OF THE INVENTION

Accordingly, it is an object of the present invention to provide an optical transmission line including first, second and third fibers so that an optical signal travels through the transmission line from the first fiber, then through the second fiber and then through the third fiber to be output from an output end of the third fiber. The first fiber has a positive dispersion for a wavelength of the optical signal. The second fiber has a negative dispersion for the wavelength of the optical signal and a mode field diameter smaller than a mode field diameter of the first fiber. The third fiber has a mode field diameter smaller than the mode field diameter of the second fiber. Pump light is provided to the third fiber from the output end so that the pump light travels through the transmission line in an opposite direction than the optical signal and causes Raman amplification to occur in the transmission line.

Objects of the present invention are also achieved by providing an optical transmission line including first and second fibers so that an optical signal travels through the transmission line from the first fiber and then through the second fiber to be output from an output end of the second fiber. The first fiber has a positive dispersion for a wavelength of the optical signal. The second fiber has a negative dispersion for the wavelength of the optical signal and a mode field diameter smaller than a mode field diameter of the first fiber. Pump light is supplied to the second fiber from the output end so that the pump light travels through the transmission line in an opposite direction than the optical signal and causes Raman amplification to occur in the second fiber which substantially equalizes transmission loss in the second fiber.

Objects of the present invention are further achieved by providing an optical transmission line including first, second and third fibers so that an optical signal travels through the transmission line from the first fiber, then through the second fiber and then through the third fiber to be output from an output end of the third fiber. The first fiber has a dispersion which is one of the group consisting of a positive dispersion and a negative dispersion for a wavelength of the optical signal. The second fiber has a dispersion which is the other of said one of the group consisting of a positive and negative dispersion for the wavelength of the optical signal. The second fiber has a mode field diameter smaller than a mode field diameter of the first fiber. The third fiber has a mode field diameter smaller than the mode field diameter of the second fiber. Pump light is provided to the third fiber from the output end so that the pump light travels through the transmission line in an opposite direction than the optical signal and causes Raman amplification to occur in the transmission line.

In addition, objects of the present invention are achieved by providing an optical transmission line including first and second fibers so that an optical signal travels through the transmission line from the first fiber and then through the second fiber to be output from an output end of the second fiber. The first fiber has a dispersion which is one of the group consisting of a positive dispersion and a negative dispersion for a wavelength of the optical signal. The second fiber has a dispersion which is the other of said one of the group consisting of a positive dispersion and a negative dispersion for the wavelength of the optical signal. The second fiber has a mode field diameter smaller than a mode field diameter of the first fiber. Pump light is supplied to the second fiber from the output end so that the pump light travels through the transmission line in an opposite direction than the optical signal and causes Raman amplification to occur in the second fiber which substantially equalizes transmission loss in the second fiber.

Objects of the present invention are also achieved by providing a Raman amplification medium provided with pump light so that an optical signal is Raman amplified as the optical signal travels through the Raman amplification medium. The Raman amplification medium has characteristics so that dispersion slope of the Raman amplification medium is substantially zero and wavelength dispersion per fiber length of the Raman amplification medium is not zero for a wavelength of the optical signal.

Further, objects of the present invention are achieved by providing an apparatus including first and second optical amplifiers. The first optical amplifier includes an optical fiber provided with pump light so that an optical signal traveling through the optical fiber is amplified by Raman amplification and then output from the first optical amplifier, the optical fiber having a positive dispersion per fiber length for a wavelength of the optical signal. The second optical amplifier amplifies the optical signal output from the first optical amplifier. The second optical amplifier includes an optical fiber provided with pump light so that the optical signal travels through the optical fiber of the second optical amplifier and is thereby amplified by Raman amplification, the optical fiber of the second optical amplifier having a negative dispersion per fiber length for the wavelength of the optical signal.

Objects of the present invention are achieved by providing an apparatus including first and second optical amplifiers. The first optical amplifier includes an optical fiber provided with pump light so that an optical signal traveling through the optical fiber is amplified by Raman amplification and then output from the first optical amplifier, the optical fiber having one of the group consisting of a positive dispersion per fiber length for a wavelength of the optical signal and a negative dispersion per fiber length for the wavelength of the optical signal. The second optical amplifier amplifies the optical signal output from the first optical amplifier. The second optical amplifier includes an optical fiber provided with pump light so that the optical signal travels through the optical fiber and is thereby amplified by Raman amplification, the optical fiber having the other of said one of the group consisting of a positive dispersion per fiber length for the wavelength of the optical signal and a negative dispersion per fiber length for the wavelength of the optical signal.

Additional objects and advantages of the invention will be set forth in part in the description which follows, and, in part, will be obvious from the description, or may be learned by practice of the invention.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

DESCRIPTION OF THE PREFERRED EMBODIMENTS

Figure 1:
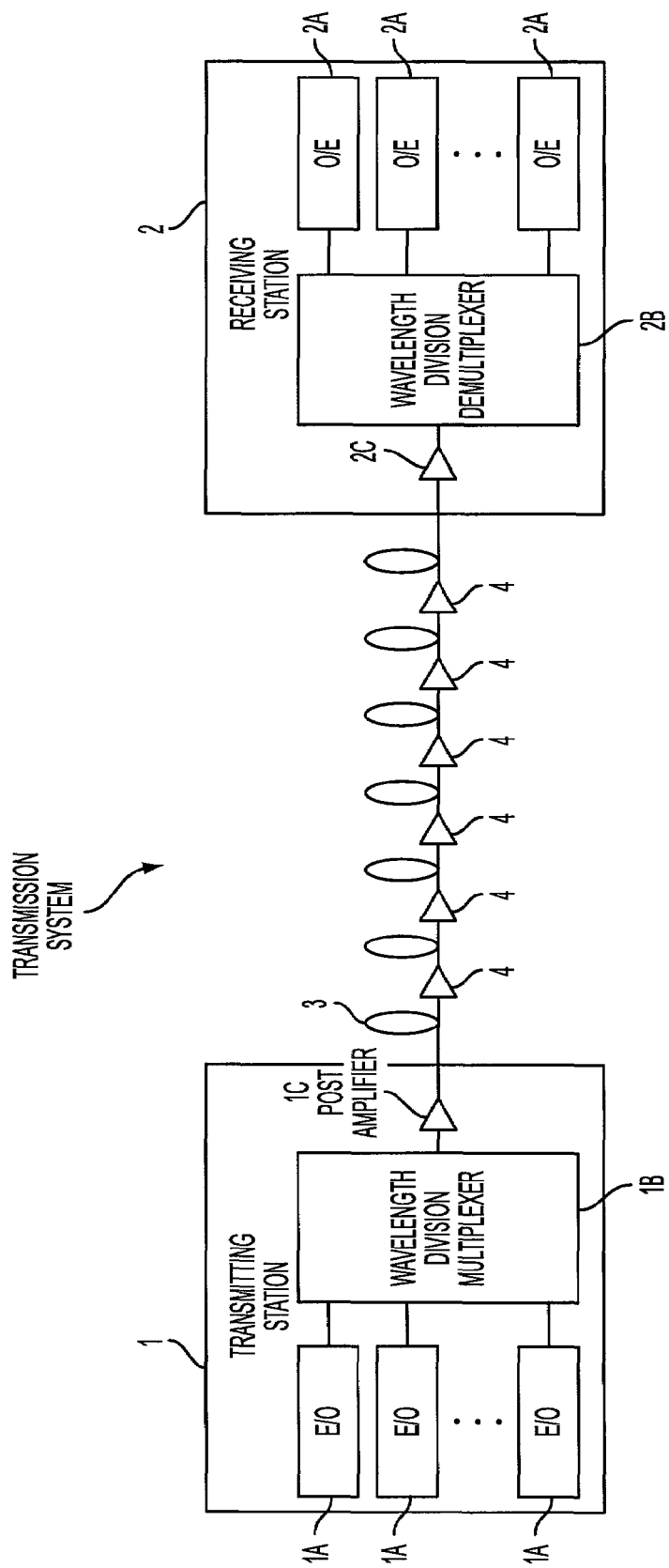
FIG. 1 (prior art) is a diagram illustrating a WDM optical communication system.

Reference will now be made in detail to the present preferred embodiments of the present invention, examples of which are illustrated in the accompanying drawings, wherein like reference numerals refer to like elements throughout.

Figure 2:
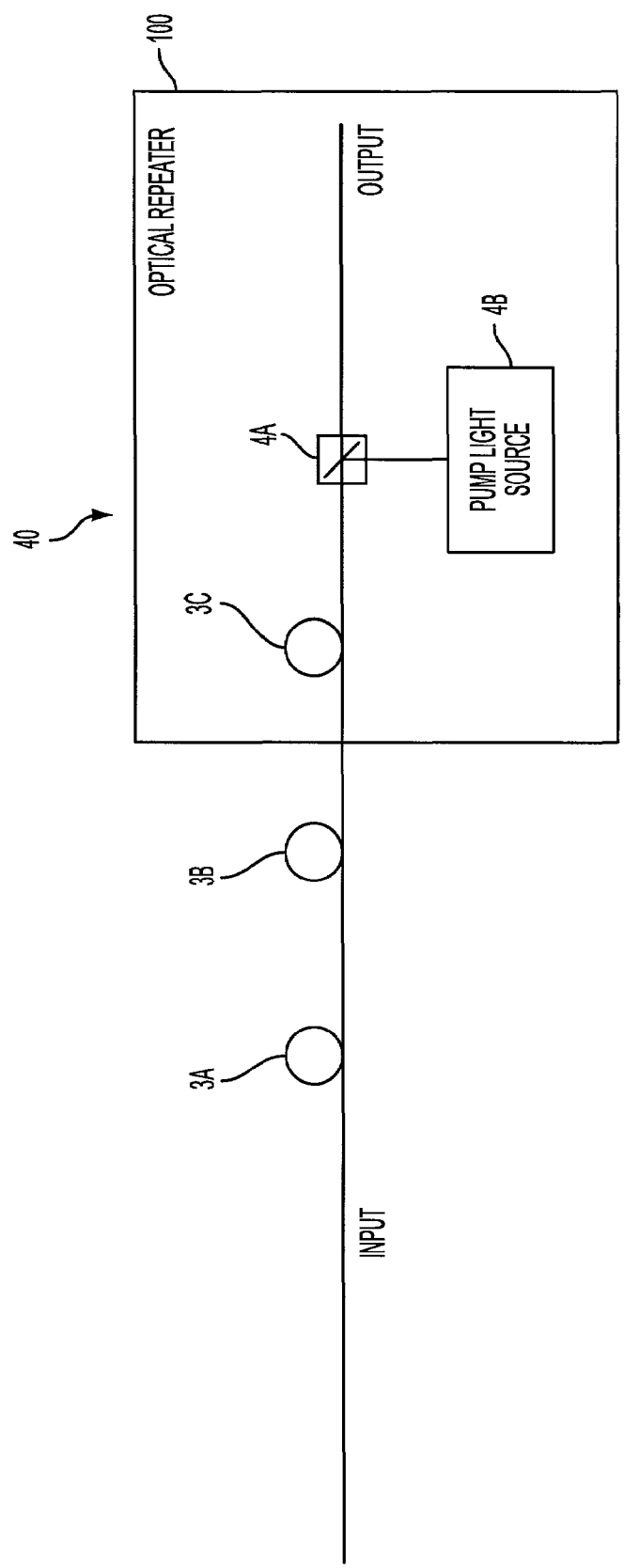
FIG. 2 is a diagram illustrating an optical repeater in an optical communication system, according to an embodiment of the present invention.

FIG. 2 is a diagram illustrating a repeating section of an optical communication system, according to an embodiment of the present invention. Referring now to FIG. 2, an optical signal travels through a first fiber 3A, a second fiber 3B and then a third fiber 3C. The optical signal is, for example, a WDM optical signal, but the present invention is not limited to the optical signal being a WDM optical signal.

A pump light source 4B provides pump light to an output end of third fiber 3C via a wavelength combiner 4A. The pump light travels through the transmission line in an opposite direction than the optical signal, and causes Raman amplification to occur in the transmission line. Pump light source 4B, wavelength combiner 4A and third fiber 3C form an optical repeater 40.

Figure 3:
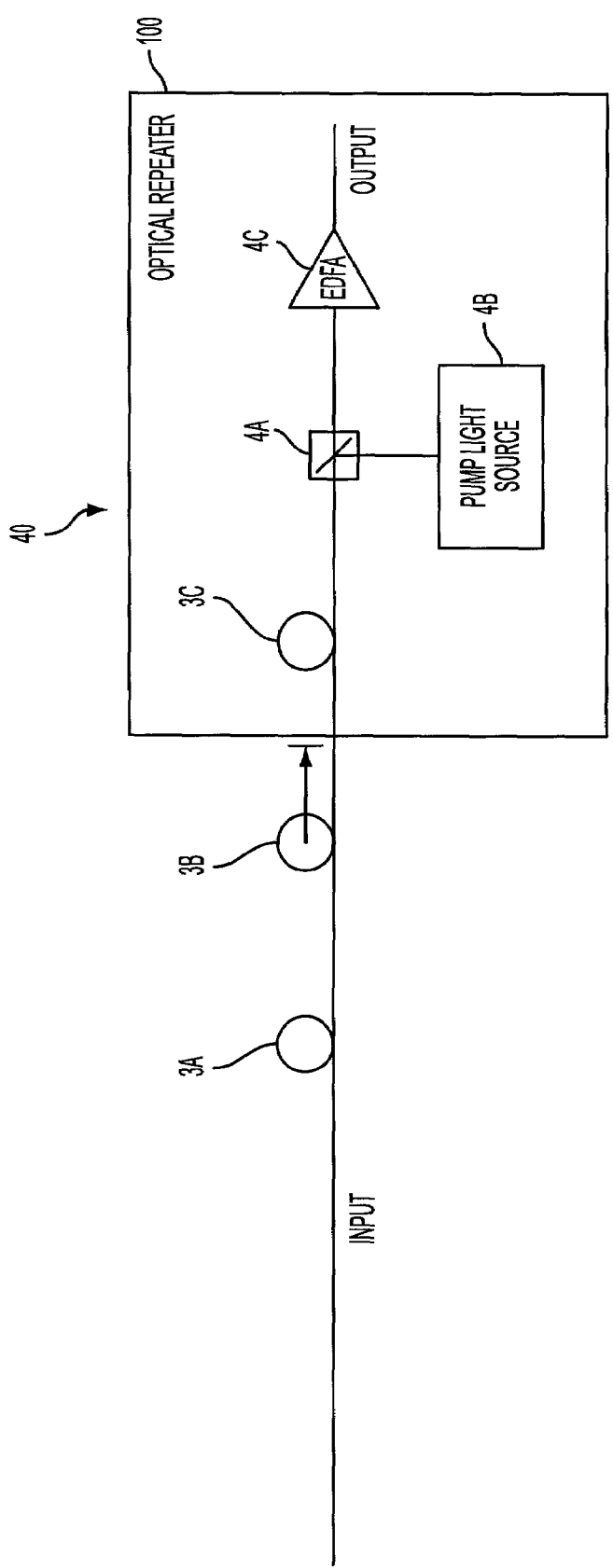
FIG. 3 is a diagram illustrating an optical repeater in an optical communication system, according to an embodiment of the present invention.

FIG. 3 is similar to FIG. 2, but shows the use of an EDFA 4C to amplify the optical signal after undergoing Raman amplification. EDFA 4C is provided downstream of wavelength combiner 4A. Therefore, in FIG. 3, a Raman amplifier is used in combination with EDFA 4C to provide an optical amplification repeater.

In FIGS. 2 and 3, pump light source 4B, wavelength combiner 4A and third fiber 3C are shown as being inside repeater 40 (that is, inside the same enclosure 100), with first fiber 3A and second fiber 3B being outside of enclosure 100. However, the present invention is not limited to third fiber 3C being inside enclosure 100. For example, third fiber 3C in FIGS. 2 and 3 may be provided within a cable of the transmission path at the outside of repeater 40. Moreover, the present invention is not limited to first fiber 3A and second fiber 3B being outside of repeater 40.

Moreover, in FIG. 3, EDFA 4C is shown as being inside enclosure 100. However, the present invention is not limited to EDFA 4C as being inside enclosure 100.

Fiber characteristics of first fiber 3A, second fiber 3B and third fiber 3C are described in the following Table 1.

TABLE 1

| | 1st fiber | 2nd fiber | 3rd fiber |
| --- | --- | --- | --- |
| Dispersion | Positive | Negative | Negative |
| Dispersion slope | Positive | Negative | Negative |
| Non-linear effective core area | Large | Intermediate | Small |
| Loss per unit length | Small | Intermediate | Large |
| Length | Long | Intermediate | Short |
| Loss | Large | Intermediate | Small |

Referring again to FIGS. 2 and 3, and Table 1, a WDM optical signal is emitted, for example, from a terminal (not illustrated) or from an optical amplification repeater (not illustrated) of the proceeding stage, propagates through first fiber 3A having a positive wavelength dispersion and dispersion slope for a wavelength of the WDM optical signal and having a comparatively large mode field diameter. The WDM optical signal then propagated through second fiber 3B having negative dispersion and dispersion slope for the wavelength of the WDM optical signal and having a smaller mode field diameter than first fiber 3A. The WDM optical signal then propagates through third fiber 3C. Third fiber 3C has the shortest length and smallest mode field diameter of fibers 3A, 3B and 3C. Thereafter, the WDM optical signal is incident, for example, to the transmission path fiber in the next stage, such as to a first fiber 3A in the next stage.

The pump light emitted from pump light source 4B for Raman amplification is incident to third fiber 3C via waveform combiner 4A, which combines the WDM optical signal and the pump light. The pump light propagate through third fiber 3C, then through second fiber 3B, and is then incident to first fiber 3A. Therefore, the pump light travels in the opposite direction than the WDM optical signal.

In some embodiments, pump light source 4B emits only pump light at one wavelength. However, the present invention is not limited to this. Instead, for example, pump light source 4B might emit multiple pump lights which are multiplexed together and might, for example, be at different wavelengths.

According to an embodiment of the present invention, the dispersion value of first fiber 3A is compensated only with second fiber 3B, or by a combination of second fiber 3B with third fiber 3C, and loss generated in second fiber 3B is compensated with the gain of the Raman amplification generated in second fiber 3B.

Moreover, according to an embodiment of the present invention, amplification is performed to that the loss in the total transmission path can be compensated with the gain of the Raman amplification generated in third fiber 3C.

With the structure explained above, distortion due to the mutual phase modulation based on the non-linear effect generated in second fiber 3B for compensating for the dispersion value of first fiber 3A can be reduced.

The OSNR of the signal light can be improved and transmission waveform distortion due to the non-linear effect of fiber can also be alleviated by compensating for the total loss of the transmission path with the short-length third fiber 3C having the small non-linear effective cross-sectional area.

Third fiber 3C has a small non-linear type effective cross-sectional area and results in a large non-linear effect, but these do not generate problems because the length is substantially short.

The WDM optical signal experiences loss in first fiber 3A. Loss in second fiber 3B is equalized with the gain of the Raman amplification in second fiber 3B. Therefore, at the output of second fiber 3B, the WDM optical signal experiences a change in power as compared to the power at the input of first fiber 3A. The WDM optical signal then obtains a gain from Raman amplification in third fiber 3C.

Figure 4:
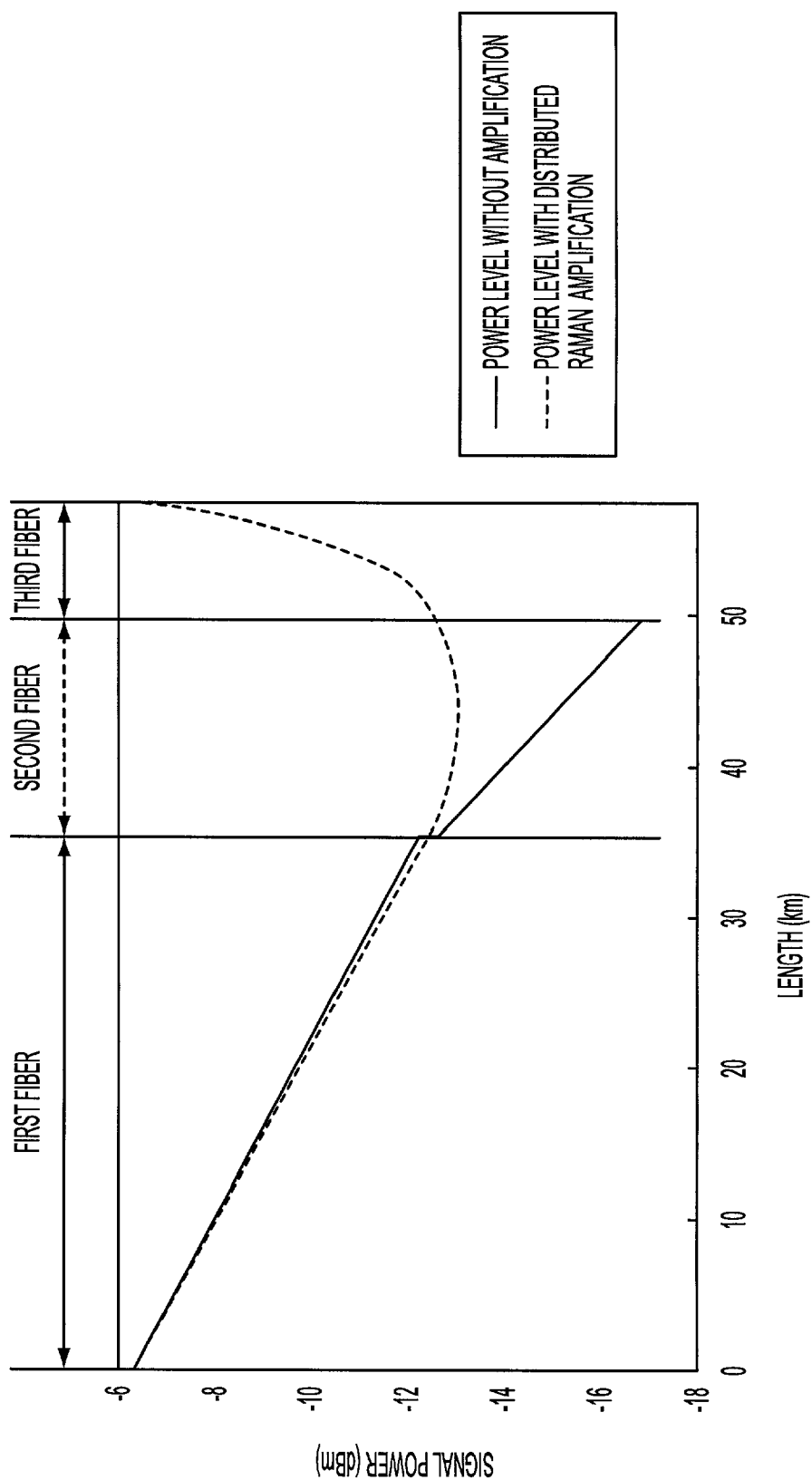
FIG. 4 is a graph illustrating the relationship between signal power and fiber length in an optical communication system, according to an embodiment of the present invention.

FIG. 4 is a graph illustrating the relationship between signal power of the WDM optical signal and length of the fibers when the transmission loss of second fiber 3B is equalized with the gain of the distributed Raman amplifier in second fiber 3B. Referring now to FIG. 4, when the transmission loss of second fiber 3B is equalized with the gain of the distributed Raman amplifier in second fiber 3B, the signal power is not significantly attenuated in the longitudinal direction of FIG. 4 from the input of second fiber 3B to the output of second fiber 3B.

Therefore, wavelength dispersion of the fiber can cause a change in signal power between optical signals at different wavelengths in the WDM optical signal. However, the change in signal power will be small whether the signals become near or far from each other. As a result, a difference of the frequency shift is small between the mutual phase modulation generated when the optical signals become near and the mutual phase modulation generated when the optical signals become far.

Moreover, the signs of the frequency shift due to the mutual phase modulation when the optical signals become near or far from each other are inverted and are cancelled with each other. In addition, the frequency shift due to the accumulated mutual phase modulation becomes small. Therefore, transmission waveform distortion can be lowered.

Since third fiber 3C has a small core diameter, higher gain can be attained even when the length is rather short.

Moreover, when considering repairs to the transmission line, since third optical fiber 3C has a small core diameter and cannot easily be repaired, it is preferable to allocate third fiber 3C within optical repeater 40.

With first fiber 3A having a positive dispersion amount, an appropriate dispersion compensation amount can be provided in second fiber 3B and third fiber 3C taken together.

Therefore, since first fiber 3A has positive dispersion slope, second fiber 3B has negative dispersion slope and third fiber 3C has negative dispersion slope, the absolute value of the dispersion slope of the transmission path can be reduced.

Figure 5:
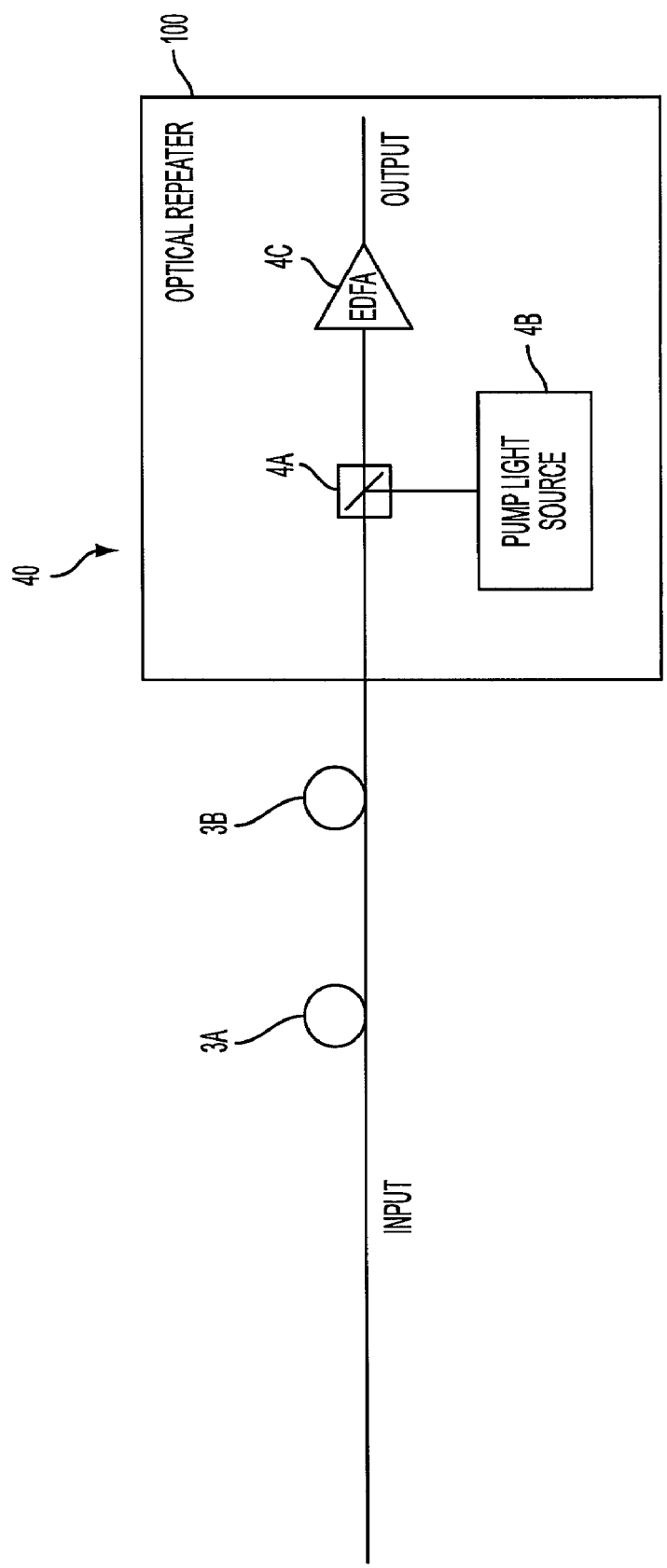
FIG. 5 is a diagram illustrating an optical repeater in an optical communication system, according to an embodiment of the present invention.

FIG. 5 is a diagram illustrating an optical amplification repeater of an optical communication system, according to an embodiment of the present invention. Referring now to FIG. 5, only first fiber 3A and second fiber 3B are used. Third fiber 3C is not used in the embodiment of FIG. 5. Therefore, a WDM optical signal travels through first fiber 3A and then second fiber 3B. The WDM optical signal is amplified by Raman amplification via pump light provided by pump light source 4B and which travels through the transmission line in an opposite direction than the WDM optical signal. Of course, the present invention is not limited to the optical signal being a WDM optical signal.

In FIG. 5, repeater 40, first fiber 3A and second fiber 3B form one repeating section of an optical communication system.

EDFA 4C can be provided to amplify the WDM optical signal after undergoing Raman amplification. In FIG. 5, EDFA 4C is shown as being inside enclosure 100 However, EDFA 4C can be outside of enclosure 100. Moreover, the present invention is not limited to the use of EDFA 4C.

In FIG. 5, first fiber 3A and second fiber 3B are both outside of enclosure 100. However, the present invention is not limited in this manner.

Therefore, in FIG. 5, a WDM optical signal is emitted, for example, from a terminal (not illustrated) or optical amplification repeater (not illustrated) of the preceding stage, and then propagates through first fiber 3A having a positive wavelength dispersion and dispersion slope for a signal wavelength and having a comparatively large mode field diameter. Then, the WDM optical signal propagates through second fiber 3B having a negative wavelength dispersion and dispersion slope for the signal wavelength and having a smaller mode field diameter than first fiber 3A. Thereafter, the WDM optical signal passes wavelength combiner 4A for combining the WDM optical signal and a pump light. Second optical fiber 3B has a dispersion value for compensating for dispersion of first fiber 3A.

After passing wavelength combiner 4A, the WDM optical signal is incident to EDFA 4C connected after wavelength combiner 4A and having a gain which compensates for transmission loss of first fiber 3A. After amplification by EDFA 4C, the WDM optical signal is incident to a transmission fiber of the next stage, for example, to first fiber 3A of the next stage.

The pump light emitted from pump light source 4B and applied to the Raman amplifier is incident to second fiber 3B via wavelength combiner 4A and then propagates through second fiber 3B. Thereafter, the pump light is incident to first fiber 3A. Pump light source 4B might emit pump light at a single wavelength. Alternatively, for example, pump light source 4B might emit a plurality of pump light which are multiplexed together and then provided to the transmission line as a multiplexed pump light. The different pump light multiplexed together might, for example, be at different wavelengths.

The OSNR of the WDM optical signal can be improved, and the transmission waveform distortion by the fiber non-linear effect can also be alleviated, by utilizing a Raman amplifier in which the pump light propagates in the fiber in the opposite direction than the WDM optical signal.

Figure 6:
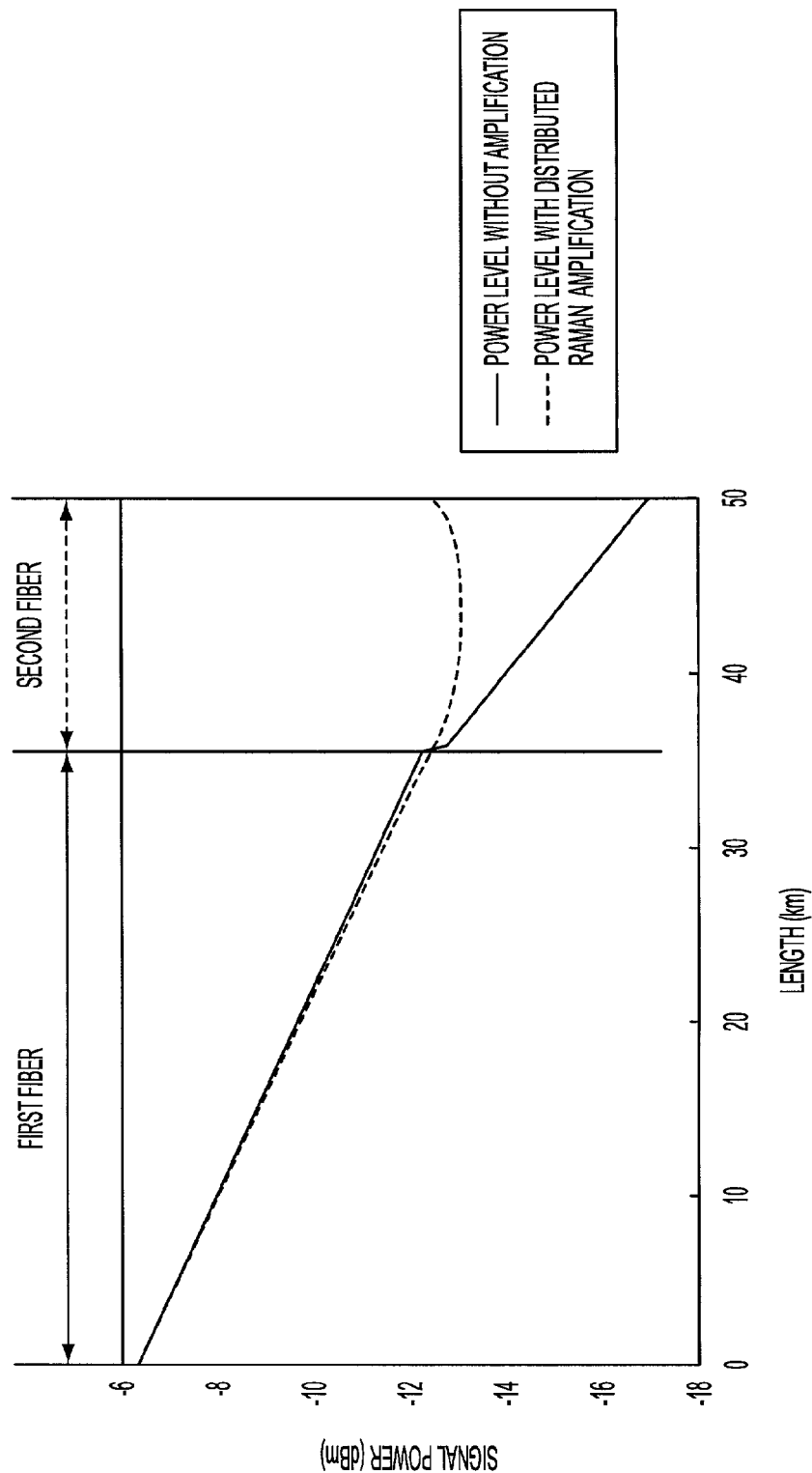
FIG. 6 is a graph illustrating the relationship between signal power and fiber length in an optical communication system, according to an embodiment of the present invention.

FIG. 6 is a graph illustrating the relationship between the signal power of the WDM optical signal and length of the various fibers when the transmission loss of second fiber 3B is equalized by the gain of the distributed Raman amplifier, for the configuration in FIG. 5. Referring now to FIG. 6, when the transmission loss of second fiber 3B is matched with the gain of the distributed Raman amplifier, the signal power is not significantly attenuated in the longitudinal direction of FIG. 6 at the output of second fiber 3B as compared to the input of second fiber 3B.

Therefore, since change of signal power becomes small when a respective optical signal becomes near or far another optical signal of a different wavelength due to wavelength dispersion of a fiber, a difference between the frequency shift due to mutual phase modulation when the respective optical signal becomes near the other optical signal and the frequency shift due to the mutual phase modulation when the respective optical signal becomes far from the other optical signal can be reduced.

Here, the sign of the frequency shift due to the mutual phase modulation when the respective optical signal becomes near the other optical signal is inverted from the sign of the frequency shift due to the mutual phase modulation when the respective optical signal becomes far from the other optical signal, and these frequency shifts are cancelled with each other. Therefore, the frequency shift due to the accumulated mutual phase modulation becomes small and thereby the transmission waveform distortion can also be reduced.

Loss of the WDM optical signal can be prevented by using an optical amplifier, such as EDFA 4C, which has a gain corresponding to loss of the transmission path as a whole.

The effect of second fiber 3B in FIG. 5 is the same as that described above for FIG. 2.

Figure 7:
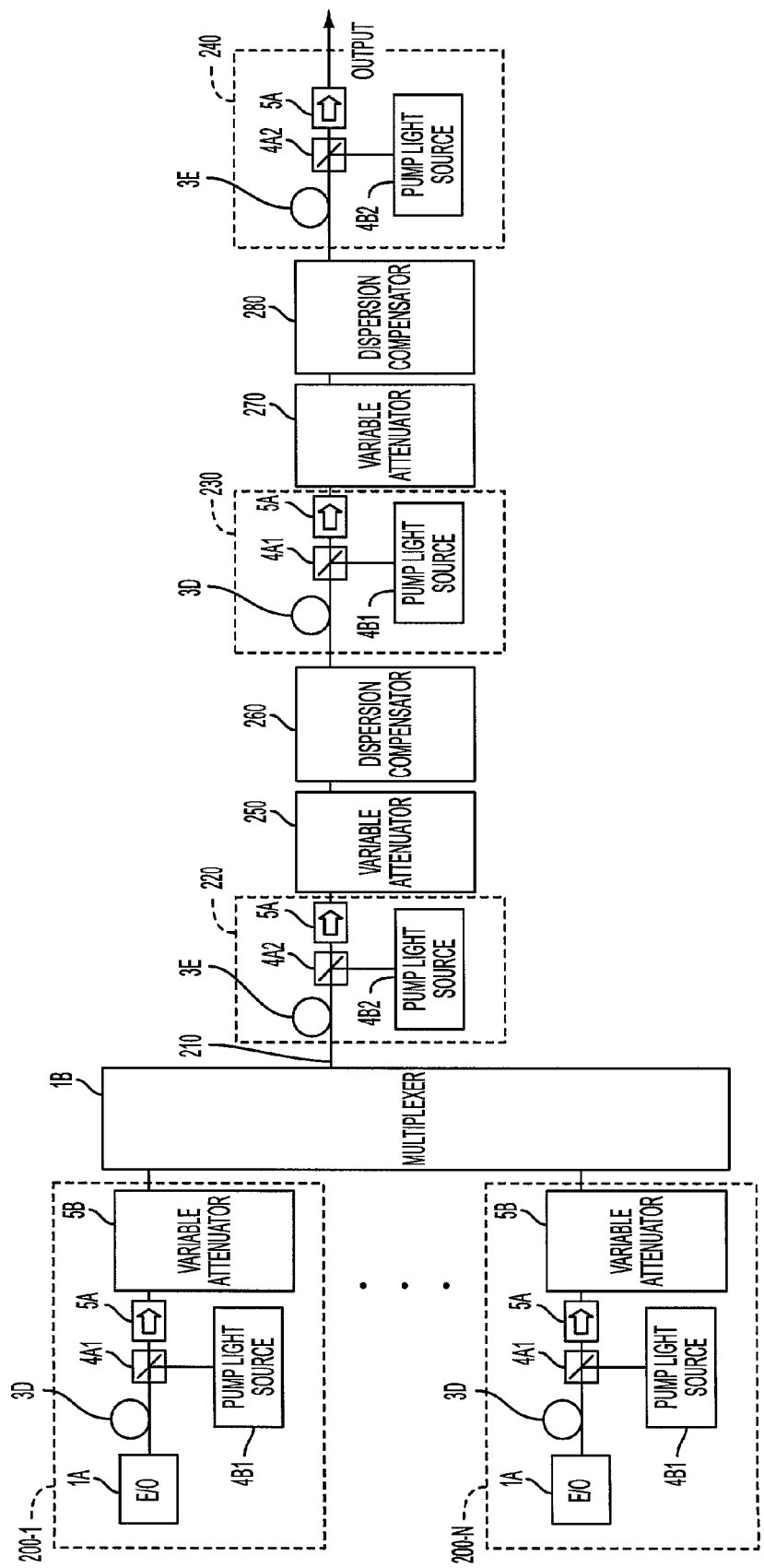
FIG. 7 is a diagram illustrating an optical terminal station in an optical communication system, according to an embodiment of the present invention.

FIG. 7 is a diagram illustrating an optical terminal station using distributed Raman amplification, according to an embodiment of the present invention. Referring now to FIG. 7, a plurality of optical signal generating portions 200-1 to 200-N each includes an optical transmitter (E/O) 1A, an optical fiber 3D, a pump light source 4B1, a wavelength combiner 4A1, an optical isolator 5A and a variable attenuator 5B. The optical transmitter 1A of each optical signal generating portion 200-1 to 200-N generates an optical signal at a different wavelength than the optical transmitters 1A of the other optical signal generating portions 200-1 to 200-N.

For each optical signal generating portion 200-1 to 200-N, the corresponding optical transmitter 1A generates an optical signal which propagates through the corresponding fiber 3D. Fiber 3D has a relatively small mode field diameter, as compared to an ordinary transmission line. Therefore, fiber 3D is a suitable fiber for Raman amplification. The corresponding pump light source 4B1 provides pump light to fiber 3D via wavelength combiner 4A1. The pump light causes the optical signal to be amplified by Raman amplification as the optical signal travels through fiber 3D, and is thereby amplified to a predetermined signal power. The corresponding variable attenuator 5B adjusts the signal power. The corresponding optical isolator 5A is between the corresponding wavelength combiner 4A1 and the corresponding variable attenuator 5B.

A multiplexer 1B wavelength division multiplexes the attenuated optical signals from the optical signal generating portion 200-1 to 200-N into a WDM optical signal.

The WDM optical signal propagates through an optical transmission line 210. Various stages, such as, for example, a first stage 220, a second stage 230 and a third stage 240, are arranged along transmission line 210.

First stage 220 includes, for example, an optical fiber 3E, a pump light source 4B2, a wavelength combiner 4A2 and an optical isolator 5A. Fiber 3E has a relatively small mode field diameter, as compared to an ordinary transmission line. Therefore, fiber 3E is a suitable fiber for Raman amplification. The WDM optical signal propagates through fiber 3E. Pump light source 4B2 provides pump light to fiber 3E via wavelength combiner 4A2 so that the WDM optical signal is amplified by Raman amplification up to a predetermined signal power as the WDM optical signal travels through fiber 3E.

A variable attenuator 250 adjusts the signal power of the WDM optical signal output from first stage 220. Optical isolator 5A is between wavelength combiner 4A2 of first stage 220 and variable attenuator 250. The WDM optical signal then passes, for example, through a dispersion compensator 260.

The WDM optical signal then travels through second stage 230. Second stage 230 includes, for example, optical fiber 3D, a pump light source 4B1, a wavelength combiner 4A1 and an optical isolator 5A. Fiber 3D has a relatively small mode field diameter, as compared to an ordinary transmission line. Therefore, fiber 3D is a suitable fiber for Raman amplification. The WDM optical signal propagates through fiber 3D. Pump light source 4B1 provides pump light to fiber 3D via wavelength combiner 4A1 so that the WDM optical signal is amplified by Raman amplification up to a predetermined signal power as the WDM optical signal travels through fiber 3D.

A variable attenuator 270 adjusts the signal power of the WDM optical signal output from second stage 230. Optical isolator 5A is between wavelength combiner 4A1 of second stage 230 and variable attenuator 270. The WDM optical signal then passes, for example, through a dispersion compensator 280.

Thereafter, the WDM optical signal travels through third stage 240. Third stage 240 includes, for example, a fiber 3E, a pump light source 4B2, a wavelength combiner 4A2 and an optical isolator 5A. Fiber 3E has a relatively small mode field diameter, as compared to an ordinary transmission line. Therefore, fiber 3E is a suitable fiber for Raman amplification. The WDM optical signal propagates through fiber 3E. Pump light source 4B2 provides pump light to fiber 3E via wavelength combiner 4A2 so that the WDM optical signal is amplified by Raman amplification up to a predetermined signal power as the WDM optical signal travels through fiber 3E. Optical isolator 5A is positioned after wavelength combiner 4A2 of third stage 240.

Although FIG. 7 shows the use of several optical isolators in specific locations, the present invention is not limited to the use of optical isolators, or to the specific positioning of the optical isolators in FIG. 7.

Moreover, the present invention is not limited to any specific number of stages, or any specific components being in a particular stage. In addition, the present invention shows the specific placement of variable attenuators and dispersion compensators along transmission line 210, but the present invention is not limited to this specific placement of variable attenuators and dispersion compensators, or to the use of such variable attenuators and dispersion compensators. For example, the present invention is not limited to a dispersion compensator being after each respective stage, or being at the output of a stage. For example, a dispersion compensator might be at the input of a stage, or placed somewhere in the stage. Alternatively, as compared to FIG. 7, a dispersion compensator might be before a corresponding variable attenuator, instead of being after the variable attenuator. Therefore, it should be understood that the specific configuration in FIG. 7 is only one example of an embodiment of the present invention, and the present invention is not limited to this specific example.

With the embodiment in FIG. 7, the accumulation amount of waveform dispersion can be reduced, and transmission waveform distortion due to the wavelength dispersion can be alleviated, by setting the wavelength dispersion per unit length of fiber 3D positive for the signal wavelength and also setting wavelength dispersion per unit length of fiber 3E negative for the signal wavelength. Here, sign of the wavelength dispersion per unit length of fiber 3D and fiber 3E is not limited to the above. Instead, for example, the positive and negative signs may be inverted.

Figure 8:
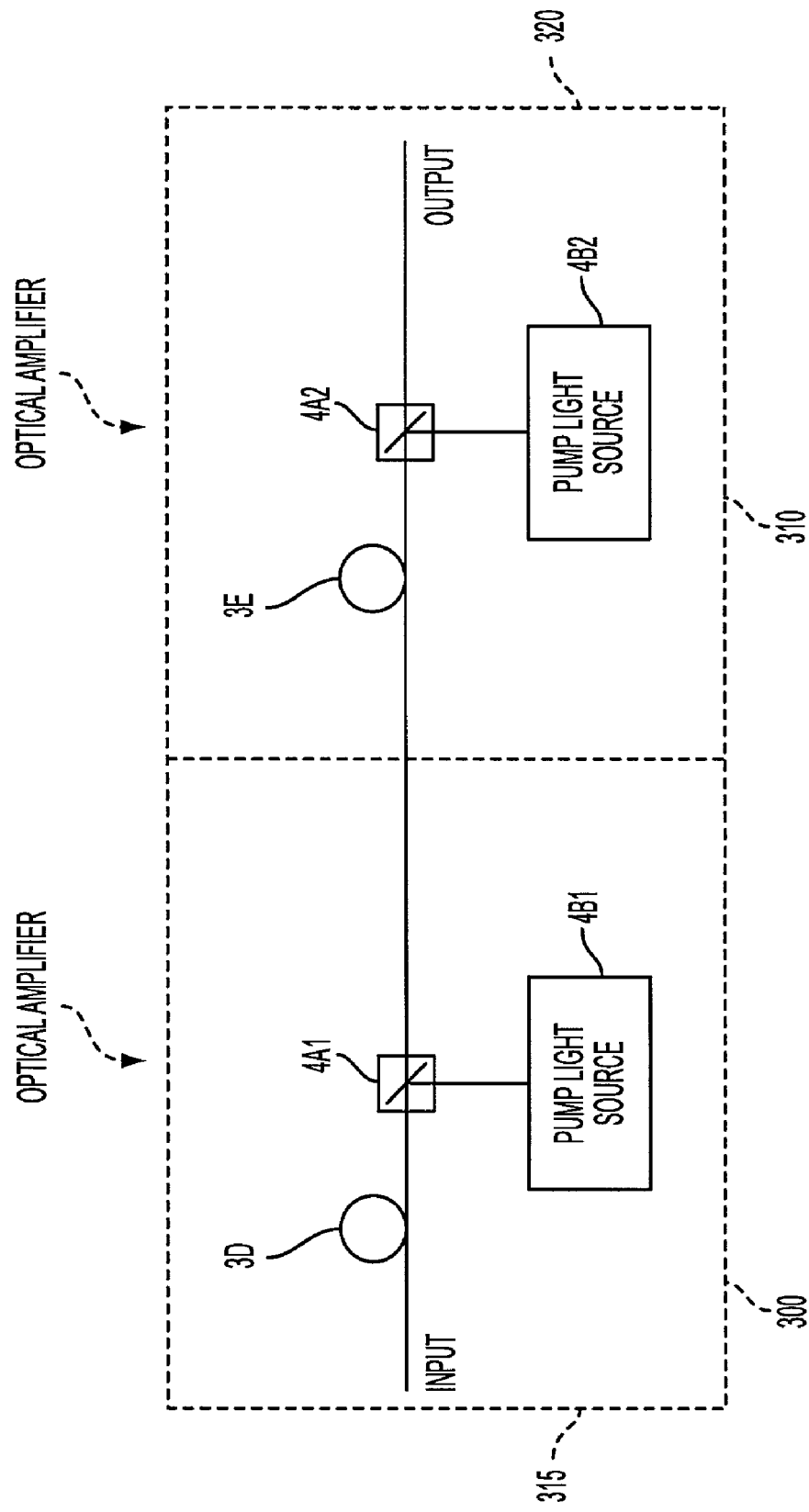
FIG. 8 is a diagram illustrating the use of optical amplifiers in an optical communication system, according to an embodiment of the present invention.

FIG. 8 is a diagram illustrating a centralized Raman amplifier, according to an embodiment of the present invention. Referring now to FIG. 8, a first optical amplifier 300 includes fiber 3D, wavelength combiner 4A1 and pump light source 4B1. A second optical amplifier 310 includes fiber 3E, wavelength combiner 4A2 and pump light source 4B2.

A WDM optical signal emitted from, for example, a terminal station (not illustrated), an upstream optical amplifier (not illustrated) or fiber (not illustrated) in a preceding stage, propagates through fiber 3D having a relatively small mode field diameter suitable for Raman amplification, and then through fiber 3E having a relatively small mode field diameter suitable for Raman amplification. Wavelength combiner 4A1 provides pump light from pump light source 4B1 to fiber 3D so that Raman amplification occurs in fiber 3D. Similarly, wavelength combiner 4A2 provides pump light from pump light source 4B2 so that Raman amplification occurs in fiber 3E. Thereafter, the WDM optical signal is incident to an optical amplifier (not illustrated) or fiber (not illustrated) of the next stage.

Pump light sources 4B1 and 4B2 might, for example, emit pump light at a single wavelength, or might emit a wavelength multiplexed pump light including a plurality of pump lights at different wavelengths.

The OSNR of the WDM optical signal may be improved, and the transmission wavelength distortion due to the fiber non-linear effect can also be alleviated, by using a Raman amplifier in which the pump light propagates in the opposite direction than the WDM optical signal in the optical fiber, such as those described above.

In FIG. 8, wavelength combiner 4A1 and pump light source 4B1 may be eliminated from the structure.

In the embodiment in FIG. 8, fiber 3D and fiber 3E do not operate as the transmission line and are instead provided within the optical amplifier. For example, fiber 3D is inside an enclosure 315 enclosing the components of optical amplifier 300, and fiber 3E is inside an enclosure 320 enclosing the component of optical amplifier 310. Alternatively, optical amplifiers 300 and 310 might both reside inside the same enclosure.

Moreover, in the present embodiment, the wavelength dispersion per unit length does not zero for a signal wavelength of the WDM optical signal and therefore the transmission waveform distortion due to the fiber non-linear effect can be alleviated.

Moreover, the transmission wavelength distortion due to the wavelength dispersion can also be alleviated by setting the dispersion slopes of fiber 3D and fiber 3E to substantially zero for the signal wavelength.

A fiber providing zero dispersion slope is called a dispersion flat fiber. An example of a diffraction index distribution forming a dispersion flat fiber is disclosed in "Dispersion Flat Fiber having W type Diffraction Index Distribution," by Akasaka, et al., General Meeting of the Institute of Electronics, Information and Communication Engineers, 1998.

Moreover, transmission waveform distortion due to the fiber non-linear effect can be alleviated by setting, for the signal wavelength, the mode field diameters of fiber 3D and fiber 3E to a comparatively smaller value than that of the optical fiber used as the transmission line, and setting the length of fiber 3D and fiber 3E to a value sufficiently smaller than the repeating interval of the transmission line, thereby reducing the absolute value of the wavelength dispersion amount.

The accumulation amount of waveform dispersion can be reduced by setting the wavelength dispersion per unit length of fiber 3D positive for the signal wavelength, while setting the wavelength dispersion per unit length of fiber 3E negative for the signal wavelength. The sign of the wavelength dispersion per unit length of fiber 3D and fiber 3E is not limited in this manner. For example, the positive and negative signs may be inverted.

Figure 9:
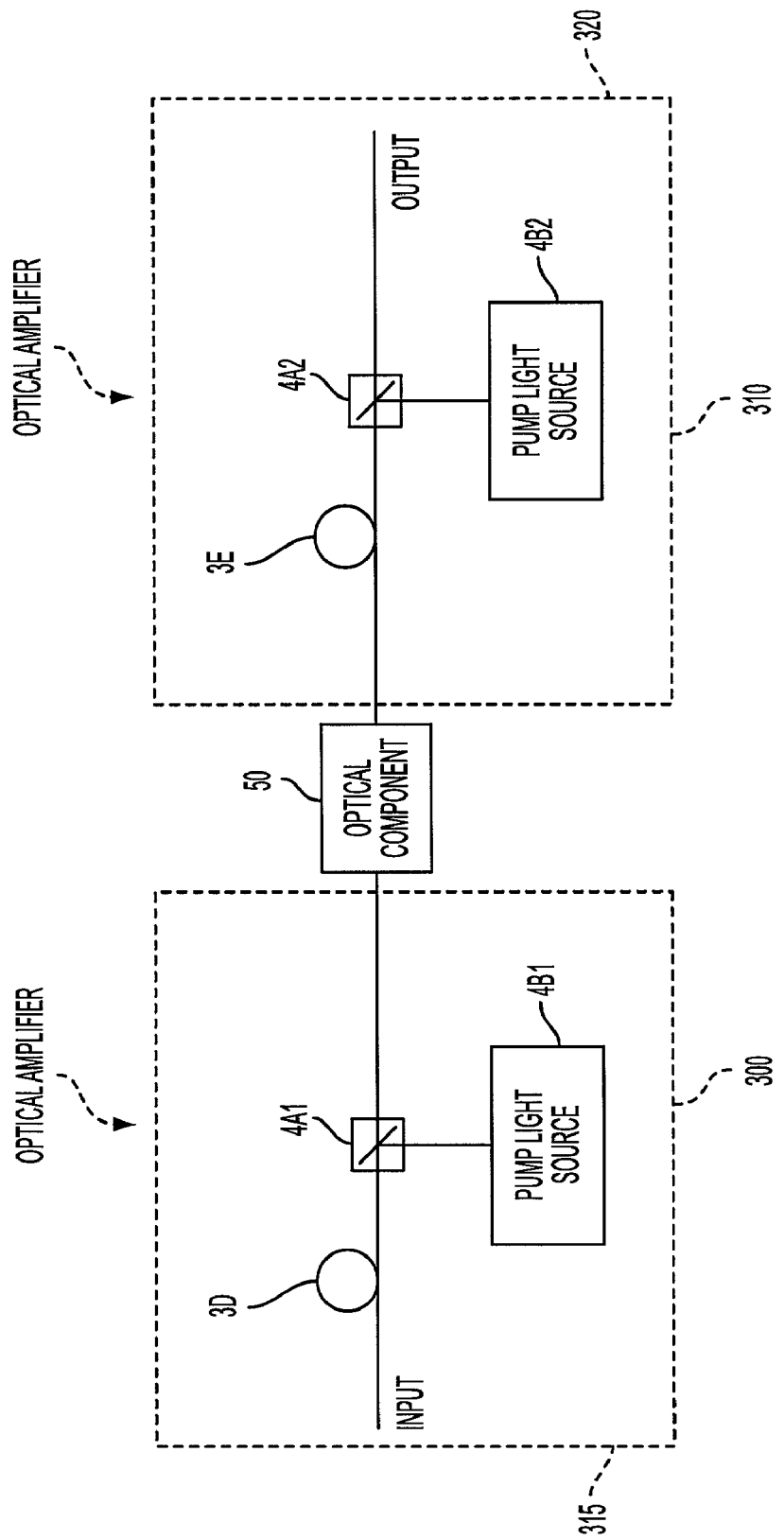
FIG. 9 is a diagram illustrating the use of optical amplifiers in an optical communication system, according to an embodiment of the present invention.

FIG. 9 is a diagram illustrating a centralized Raman amplifier, according to an additional embodiment of the present invention. The centralized Raman amplifier in FIG. 9 is the same as in FIG. 8, except that an optical component 50 is between optical amplifiers 300 and 310. Optical component 50 is not limited to being any particular type of optical component, but might be, for example, an optical filter.

In an EDFA of the related art, a monitor signal can be optically modulated by changing EDFA gain via modulating the pump light. In the present invention, a monitor signal can be optically modulated with the Raman effect in the optical fiber used as the transmission line via modulating the pump light.

Figure 10:
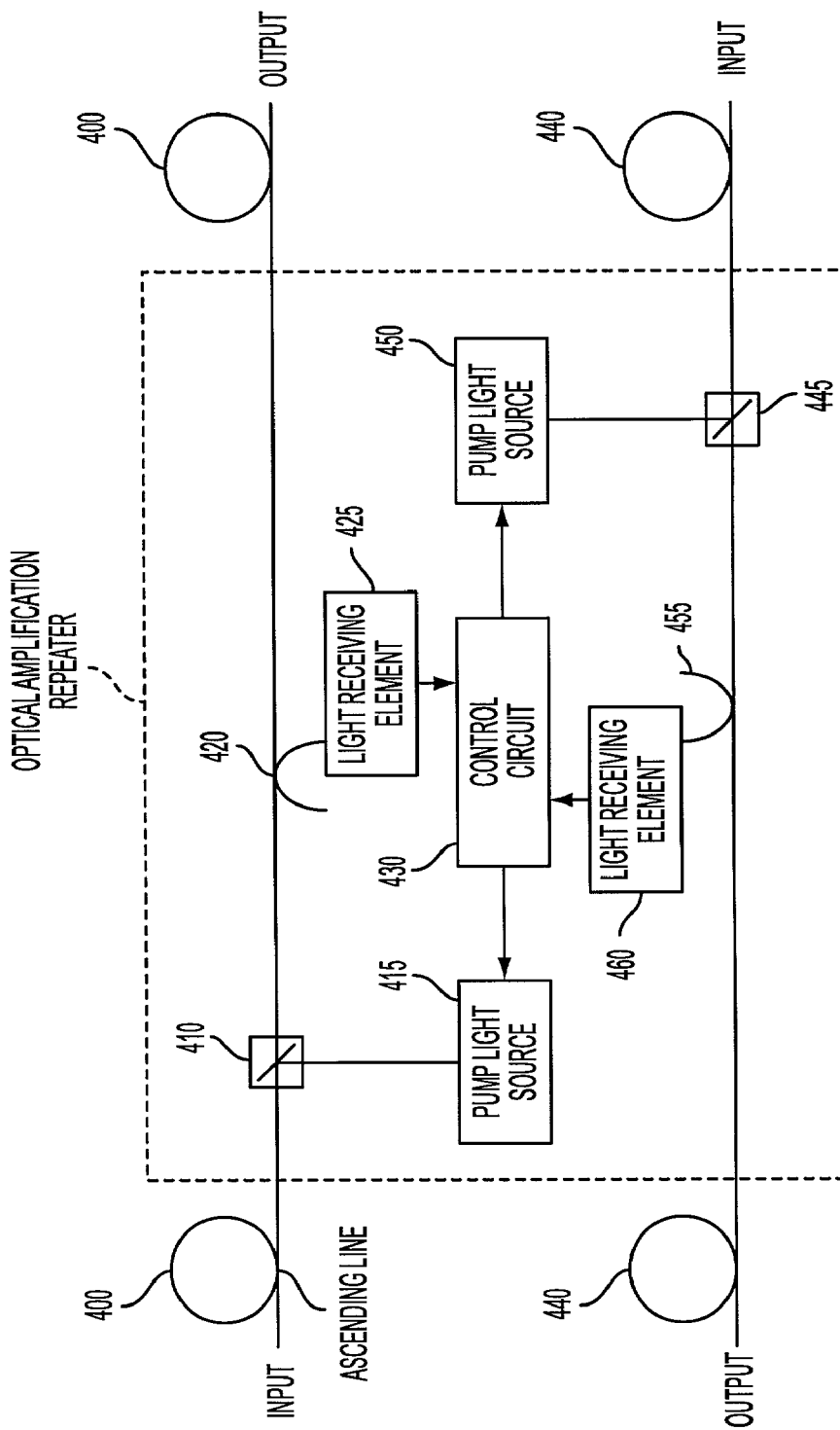
FIG. 10 is a diagram illustrating the use of a supervisory control signal in an optical communication system, according to an embodiment of the present invention.

FIG. 10 is a diagram illustrating the use of a supervisory control signal, according to an embodiment of the present invention. Referring now to FIG. 10, a WDM optical signal emitted, for example, from an optical amplifier (not illustrated) or fiber (not illustrated) of a preceding stage, propagates through an ascending transmission line 400. Transmission line 400 is an optical fiber transmission line.

A wavelength combiner 410 combines the WDM optical signal with a pump light from a pump light source 415 so that Raman amplification occurs in transmission line 400. Pump light source 415 might, for example, emit a pump light at a single wavelength, or multiplexed pump lights which might be at different wavelengths.

An optical coupler 420 branches a monitor signal from the WDM optical signal and supplies the branched monitor signal to a light receiving element 425, which converts the received monitor signal into an electrical signal. The converted electrical signal is then processed by a control circuit 430. In accordance with the processed electrical signal, control circuit 430 supplies a control signal to pump light source 415.

In a similar manner, a WDM optical signal propagates through a descending transmission line 440. Transmission line 440 is an optical fiber transmission line.

A wavelength combiner 445 combines the WDM optical signal with a pump light from pump light source 450 so that Raman amplification occurs in transmission line 440. Pump light source 450 might, for example, emit a pump light at a single wavelength, or multiplexed pump lights which might be at different wavelengths.

An optical coupler 455 branches a monitor signal from the WDM optical signal and supplies the branched monitor signal to a light receiving element 460, which converts the received monitor signal into an electrical signal. The converted electrical signal is then processed by control circuit 430. In accordance with the processed electrical signal, control circuit 430 supplies a control signal to pump light source 450.

Using the structure explained above, the monitor signal can be transmitted through ascending transmission line 400 or descending transmission line 440, and used by control circuit 430 to control Raman amplification.

Figure 11:
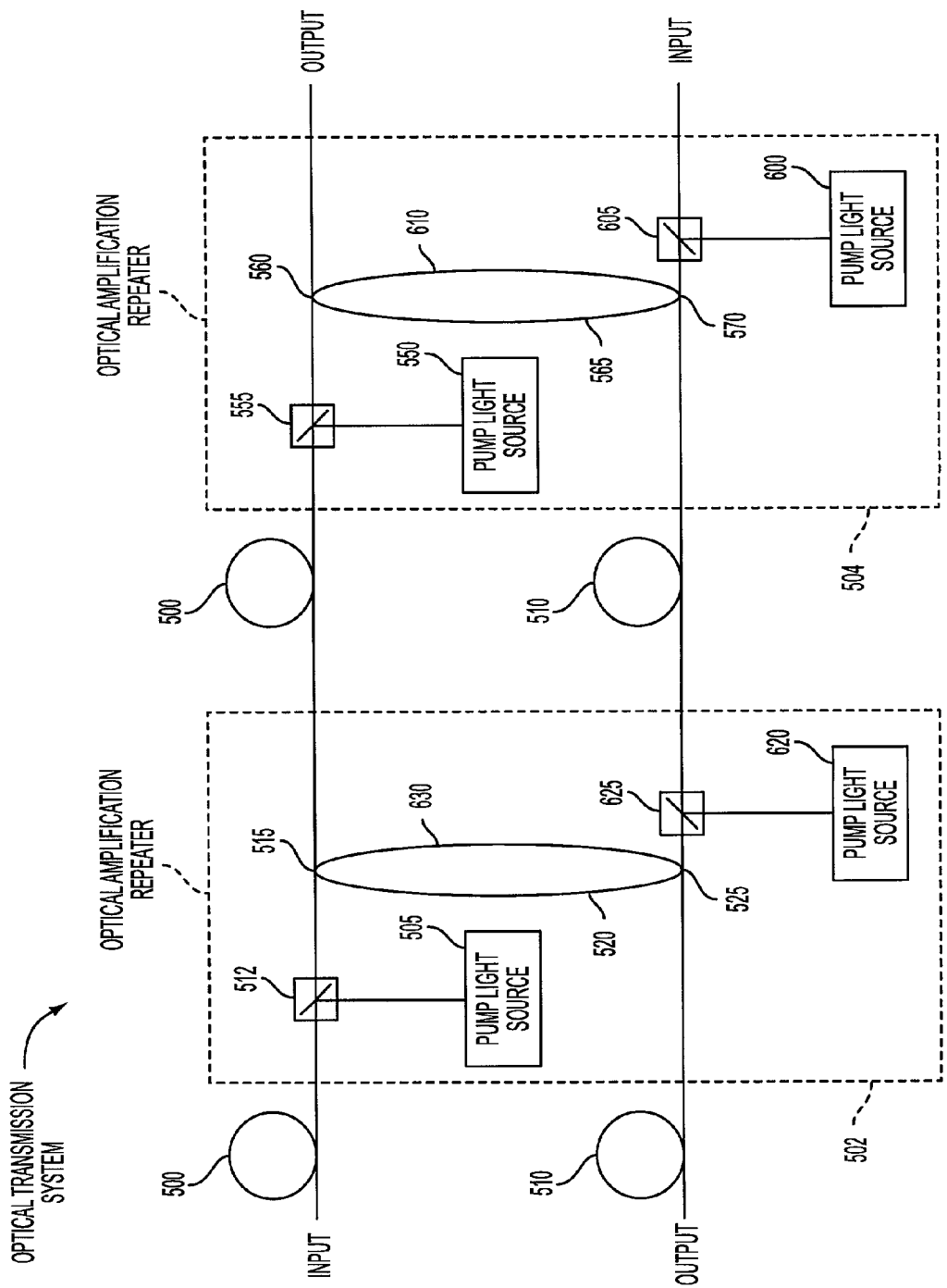
FIG. 11 is a diagram illustrating the use of an optical loop-back in an optical communication system, according to an embodiment of the present invention.

FIG. 11 is a diagram illustrating an optical loop-back in an optical communication system, according to an embodiment of the present invention. Referring now to FIG. 11, the optical communication system includes an ascending transmission line 500 and a descending transmission line 510. An optical amplification repeater 502 and an optical amplification repeater 504 are positioned along transmission lines 500 and 510, as shown in FIG. 11.

In ascending transmission line 500, a WDM optical signal is emitted, for example, from an optical amplifier (not illustrated) or fiber (not illustrated) of a preceding stage (not illustrated). The WDM optical signal propagates through transmission line 500.

Pump light source 505 provides pump light. Pump light source 505 might, for example, emit pump light of a single wavelength, or a multiplexed pump light including a plurality of pump light multiplexed together. Such multiplexed pump light might be at different wavelengths. The pump light is provided to transmission line 500 via wavelength combiner 512 so that the WDM optical signal is amplified by Raman amplification to a predetermined signal beam power.

An optical coupler 515 demultiplexes a monitor signal to an optical loop-back path 520. The monitor signal travels through optical loop-back path 520 and is provided to descending transmission line 510 via an optical coupler 525.

In this manner, the monitor signal is returned to the terminal (not illustrated) from which the monitor signal was transmitted. The terminal station can then detect the condition of repeater 502 by observing the monitor signal.

Similarly, pump light source 550 provides pump light to transmission line 500. Pump light source 550 might, for example, emit pump light of a single wavelength, or a multiplexed pump light including a plurality of pump light multiplexed together. Such multiplexed pump light might be at different wavelengths. The pump light is provided to transmission line 500 via wavelength combiner 555 so that the WDM optical signal is amplified by Raman amplification to a predetermined signal beam power.

An optical coupler 560 demultiplexes a monitor signal to an optical loop-back path 565. The monitor signal travels through optical loop-back path 565 and is provided to descending transmission line 510 via an optical coupler 570.

In this manner, the monitor signal is returned to the terminal (not illustrated) from which the monitor signal was transmitted. The terminal station can then detect the condition of repeater 504 by observing the monitor signal.

Moreover, a WDM optical signal propagates through descending transmission line 510. Pump light source 600 provides pump light. Pump light source 600 might, for example, emit pump light of a single wavelength, or a multiplexed pump light including a plurality of pump light multiplexed together. Such multiplexed pump light might be at different wavelengths. The pump light is provided to transmission line 510 via wavelength combiner 605 so that the WDM optical signal is amplified by Raman amplification to a predetermined signal beam power.

Optical coupler 570 demultiplexes a monitor signal to an optical loop-back path 610. The monitor signal travels through optical loop-back path 610 and is provided to ascending transmission line 500 via optical coupler 560.

In this manner, the monitor signal is returned to the terminal (not illustrated) from which the monitor signal was transmitted through descending transmission line 510. The terminal station can then detect the condition of repeater 504 by observing the monitor signal.

Similarly, pump light source 620 provides pump light to transmission line 510. Pump light source 620 might, for example, emit pump light of a single wavelength, or a multiplexed pump light including a plurality of pump light multiplexed together. Such multiplexed pump light might be at different wavelengths. The pump light is provided to transmission line 510 via wavelength combiner 625 so that the WDM optical signal is amplified by Raman amplification to a predetermined signal beam power.

Optical coupler 525 demultiplexes a monitor signal to an optical loop-back path 630. The monitor signal travels through optical loop-back path 630 and is provided to ascending transmission line 500 via optical coupler 575.

In this manner, the monitor signal is returned to the terminal (not illustrated) from which the monitor signal was transmitted through descending transmission line 510. The terminal station can then detect the condition of repeater 502 by observing the monitor signal.

Figure 12:
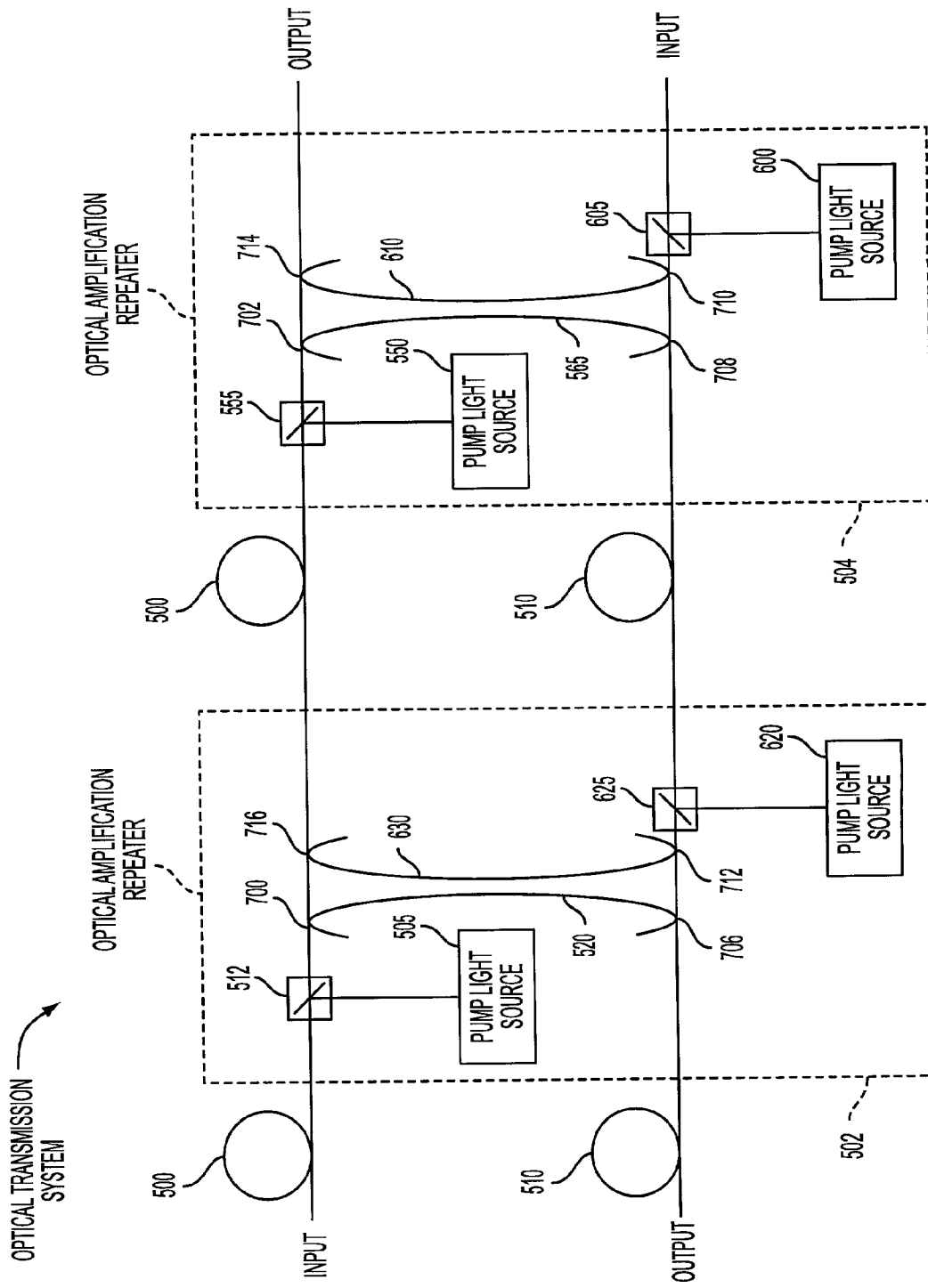
FIG. 12 is a diagram illustrating the use of an optical loop-back in an optical communication system, according to an embodiment of the present invention.
Figure 13:
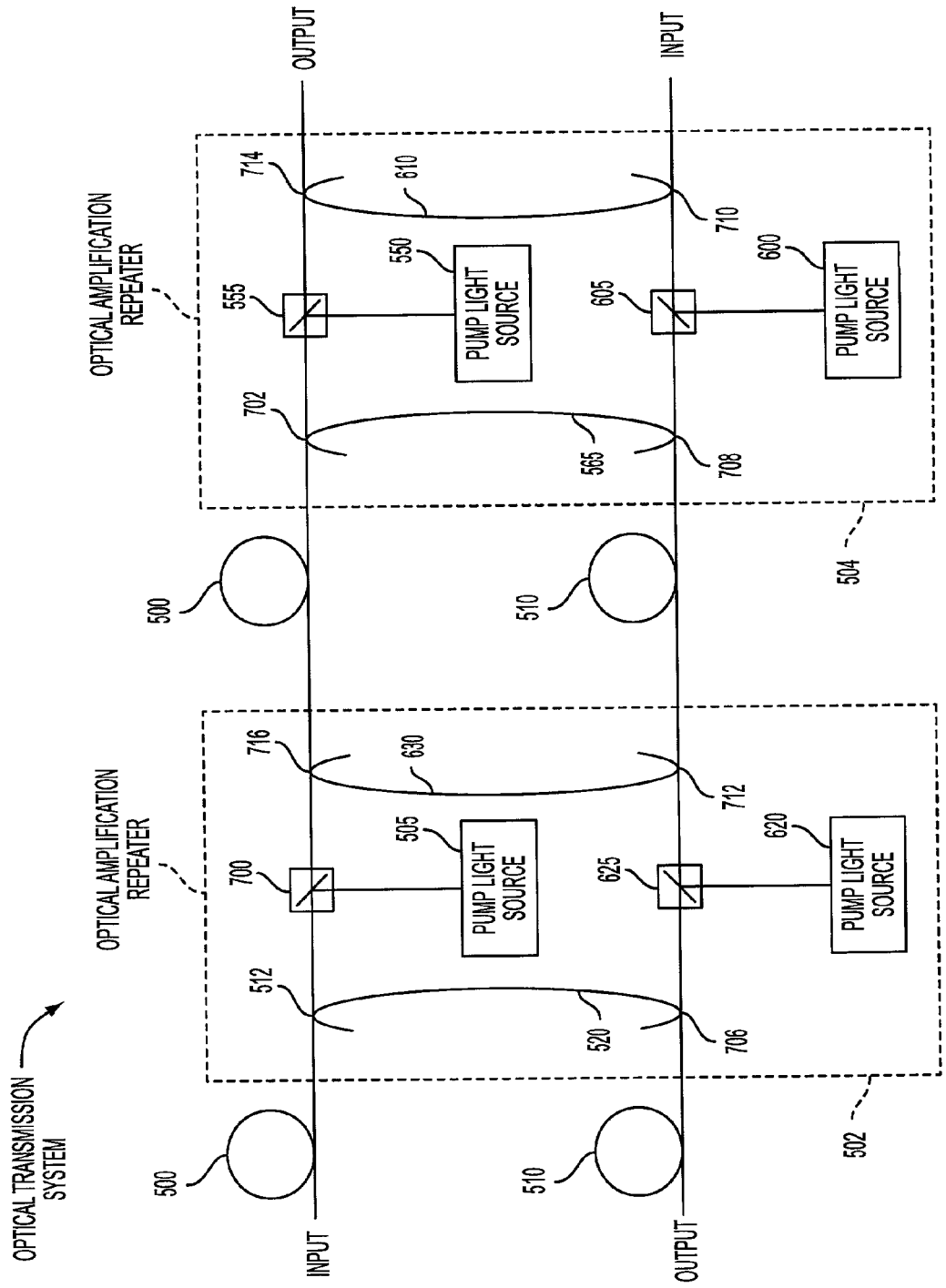
FIG. 13 is a diagram illustrating the use of an optical loop-back in an optical communication system, according to an embodiment of the present invention.

FIGS. 12 and 13 are diagrams illustrating an optical loop-back in an optical communication system, according to an additional embodiment of the present invention. Referring now to FIGS. 12 and 13, optical couplers 700 and 702 are used to provide a monitor signal to optical loop-back paths 520 and 565, respectively, from ascending transmission line 500. Optical couplers 706 and 708 are used to provide a monitor signal from optical loop-back paths 520 and 565, respectively, to descending transmission line 510.

Similarly, optical couplers 710 and 712 are used to provide a monitor signal to optical loop-back paths 610 and 630, respectively, from descending transmission line 510. Optical couplers 714 and 716 are used to provide a monitor signal from optical loop-back paths 610 and 630, respectively, to ascending transmission line 500.

According to embodiments of the present invention, an optical communication system includes a transmission line for transmitting a signal light. The transmission line is formed of a first fiber having a positive dispersion for a wavelength of the signal light, a second fiber having a negative dispersion for the wavelength of the signal light and a smaller mode field diameter than the first fiber, and a third fiber having a mode field diameter that is smaller than that of second fiber. The signal light propagates from the fibers in the sequence of the first, second and third fibers. Pump light is input to the transmission line from the third fiber in an opposite direction than the signal light, so that Raman amplification occurs the transmission line. In some embodiments, the transmission loss generated in the second fiber is equalized by the gain of the Raman amplification generated in the second fiber. Further, in some embodiments, the third fiber performs amplification which compensates for loss of the total transmission path.

Moreover, in some embodiments, the second fiber and the third fiber provide a total dispersion amount which compensates the dispersion value of the first fiber to almost zero. In some embodiments, the third fiber is provided within an optical repeater.

According to above embodiments of the present invention, an optical communication system includes a Raman amplification medium for optically amplifying an optical signal. A multiplexer multiplexes a pump light and the signal light together in the Raman amplification medium, so that Raman amplification occurs. The Raman amplifying medium assures that dispersion slope becomes zero while wavelength dispersion per fiber length does not zero for a wavelength of the signal light.

Moreover, according to above embodiments of the present invention, an optical communication system includes first and second optical amplifiers. The first optical amplifier assures positive wavelength dispersion per fiber length for a wavelength of a signal light and amplifies the signal light via Raman amplification with a pump light. The second optical amplifier assures negative wavelength dispersion per fiber length for the wavelength of the signal light and amplifies the signal light via Raman amplification using a pump light. With this structure, an accumulation amount of the wavelength dispersion can be reduced.

With above embodiments of the present invention, the signal light power to noise power ratio can be improved and transmission waveform distortion due to the fiber non-linear effect can be alleviated. Moreover, the transmission waveform distortion due to the mutual phase modulation given from a plurality of signal light can be lowered.

According to above embodiments of the present invention, deterioration of signal due to the waveform distortion can be prevented by minimizing the mutual phase modulation generated within the second fiber to compensate for dispersion generated in the first fiber of the transmission path.

Moreover, according to above embodiments of the present invention, the gain of Raman amplification generated in a respective dispersion compensation fiber is equalized to the amount of loss generated in the respective fiber.

According to embodiments of the present invention, a large Raman gain can be obtained with a centralized gain type Raman amplifier having a relatively small non-linear effective cross-sectional area and high optical power density. For example, the non-linear effective cross-section area of an ordinary optical fiber is typically 50 to 80 mm$^2$, while the non-linear effective cross-sectional area of the centralized gain type Raman amplifier is, for example, 10 mm$^2$.

Moreover, according to embodiments of the present invention, in order to avoid waveform distortion due to the non-linear effect such as four wave mixing, it is desirable to provide a non-zero absolute value of the wavelength dispersion per unit length. The value might be, for example, 1 to 10 ps/nm/km, depending on the interval of signal beam wavelengths. However, when the wavelength dispersion per length is large, a problem occurs in that the accumulated wavelength dispersion (ps/nm) becomes large.

Zero dispersion slope is preferable to assure wide signal beam wavelength band-width.

According to various embodiments of the present invention, the primary Raman gain peak optical frequency is, for example, smaller than the pumped beam frequency by 13.2 THz and since the wavelength shift of about 100 nm is generated in the 1.55 μm band, the effective wavelength band is, for example, 100 nm or less. Of course, the present invention is not limited to any particular frequencies or wavelengths.

According to embodiments of the present invention, it is also effective to adapt the Raman amplifier into an optical terminal.

A small value is preferable as the absolute value of the accumulated wavelength dispersion (ps/nm) of the optical fiber to generate Raman amplification. Moreover, it is also preferable to compensate for the wavelength dispersion of the transmission path.

Otherwise, the absolute value of the accumulated wavelength dispersion can also be reduced by, for example, using in serial the optical fiber having the wavelength dispersion of different sign as the optical fiber used in the Raman amplifier. For example, in various of the above embodiments of the present invention, fiber 3D has positive dispersion and fiber 3E has negative dispersion.

It is also possible to use the structure where a couple of optical amplifiers are directly connected. Moreover, it is possible to compensate for loss of an optical part(s) by inserting the optical part(s) between such optical amplifiers.

According to above embodiments of the present invention, a large capacity, long-distance WDM optical communication system can have improves OSNR per wavelength and reduced transmission waveform distortion due to non-linear effect.

The present invention relates to a WDM optical signal traveling through a transmission line. However, the present invention is not limited to use with a WDM optical signal. Therefore, the present invention can be applied to amplify optical signals which are not WDM optical signals.

Moreover, various fibers are described herein as having positive and negative dispersions. For example, a first fiber is described as having a positive dispersion and a second fiber as having a negative dispersion. However, in many embodiments, the dispersions can be opposite to that described. For example, the first fiber might have a negative dispersion, while the second fiber might have a positive dispersion. Therefore, the present invention is not limited to the specific dispersions shown in the above examples.

The present invention relates to the use of an optical amplifier, such as an EDFA. An EDFA is commonly used to amplify a WDM optical signal. However, the present invention is not limited to using optical amplifiers which are EDFAs, and other types of optical amplifiers might be usable. For example, an optical amplifier which uses a rare earth element other than erbium might be usable.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an optical transmission line including first, second and third fibers so that an optical signal travels through the transmission line from the first fiber, then through the second fiber and then through the third fiber to be output from an output end of the third fiber, the first fiber having a positive dispersion for a wavelength of the optical signal, the second fiber having a negative dispersion for the wavelength of the optical signal and a mode field diameter smaller than a mode field diameter of the first fiber, the third fiber having a mode field diameter smaller than the mode field diameter of the second fiber, pump light being provided to the third fiber from the output end so that the pump light travels through the transmission line in an opposite direction than the optical signal and causes Raman amplification to occur in the transmission line.

2. An apparatus as in claim 1, wherein the third fiber has a negative dispersion for the wavelength of the optical signal.

3. An apparatus as in claim 1, wherein the first fiber is directly connected to the second fiber, and the second fiber is directly connected to the third fiber.

4. An apparatus as in claim 1, further comprising:
   a pump light source providing the pump light; and
   an enclosure enclosing the pump light source and the third fiber.

5. An apparatus as in claim 1, further comprising:
   a pump light source providing the pump light;
   an optical amplifier amplifying the optical signal after being output from the output end of the third fiber; and
   an enclosure enclosing the pump light source, the optical amplifier and the third fiber.

6. An apparatus as in claim 1, wherein the Raman amplification occurring in the second fiber substantially equalizes transmission loss in the second fiber.

7. An apparatus as in claim 1, wherein the pump light travels through the third fiber, the second fiber and into the first fiber.

8. An apparatus as in claim 1, wherein the third fiber is shorter than the second fiber, and the second fiber is shorter than the first fiber.

9. An apparatus as in claim 2, wherein the first fiber is directly connected to the second fiber, and the second fiber is directly connected to the third fiber.

10. An apparatus as in claim 2, further comprising:
    a pump light source providing the pump light; and
    an enclosure enclosing the pump light source and the third fiber.

11. An apparatus as in claim 2, further comprising:
    a pump light source providing the pump light;
    an optical amplifier amplifying the optical signal after being output from the output end of the third fiber; and
    an enclosure enclosing the pump light source, the optical amplifier and the third fiber.

12. An apparatus as in claim 2, wherein the Raman amplification occurring in the second fiber substantially equalizes transmission loss in the second fiber.

13. An apparatus as in claim 4, wherein the first and second fibers are outside of the enclosure.

14. An apparatus as in claim 4, wherein the Raman amplification occurring in the second fiber substantially equalizes transmission loss in the second fiber.

15. An apparatus as in claim 5, wherein the Raman amplification occurring in the second fiber substantially equalizes transmission loss in the second fiber.

16. An apparatus as in claim 5, wherein the first and second fibers are outside of the enclosure.

17. An apparatus as in claim 10, wherein the first and second fibers are outside of the enclosure.

18. An apparatus as in claim 10, wherein the Raman amplification occurring in the second fiber substantially equalizes transmission loss in the second fiber.

19. An apparatus as in claim 11, wherein the Raman amplification occurring in the second fiber substantially equalizes transmission loss in the second fiber.

20. An apparatus as in claim 11, wherein the first and second fibers are outside of the enclosure.

21. An apparatus as in claim 13, wherein the Raman amplification occurring in the second fiber substantially equalizes transmission loss in the second fiber.

22. An apparatus as in claim 16, wherein the Raman amplification occurring in the second fiber substantially equalizes transmission loss in the second fiber.

23. An apparatus as in claim 17, wherein the Raman amplification occurring in the second fiber substantially equalizes transmission loss in the second fiber.

24. An apparatus as in claim 20, wherein the Raman amplification occurring in the second fiber substantially equalizes transmission loss in the second fiber.

25. An apparatus comprising:
an optical transmission line including first and second fibers so that an optical signal travels through the transmission line from the first fiber and then through the second fiber to be output from an output end of the second fiber, the first fiber having a positive dispersion for a wavelength of the optical signal, the second fiber being shorter than the first fiber and having a negative dispersion for the wavelength of the optical signal and a mode field diameter smaller than a mode field diameter of the first fiber, pump light being supplied to the second fiber from the output end so that the pump light travels through the second fiber and into the first fiber of the transmission line in an opposite direction than the optical signal and causes Raman amplification to occur in the second fiber which substantially equalizes transmission loss in the second fiber.

26. An apparatus as in claim 25, wherein the first fiber is directly connected to the second fiber.

27. An apparatus as in claim 25, further comprising:
a pump light source providing the pump light;
an optical amplifier amplifying the optical signal output from the output end of the second fiber; and
an enclosure enclosing the pump light source and the optical amplifier.

28. An apparatus as in claim 27, wherein the first and second fibers are outside of the enclosure.

29. An apparatus comprising:
an optical transmission line including first, second and third fibers so that an optical signal travels through the transmission line from the first fiber, then through the second fiber and then through the third fiber to be output from an output end of the third fiber, wherein
the first fiber has a dispersion which is one of a positive dispersion and a negative dispersion for a wavelength of the optical signal,
the second fiber has a dispersion which is the other of said one of a positive and negative dispersion for the wavelength of the optical signal,
the second fiber has a mode field diameter smaller than a mode field diameter of the first fiber,
the third fiber has a mode field diameter smaller than the mode field diameter of the second fiber,
pump light is provided to the third fiber from the output end so that the pump light travels through the transmission line in an opposite direction than the optical signal and causes Raman amplification to occur in the transmission line.

30. An apparatus as in claim 29, wherein the third fiber has a dispersion which is said other of said one of a positive and negative dispersion for the wavelength of the optical signal.

31. An apparatus as in claim 29, wherein the first fiber is directly connected to the second fiber, and the second fiber is directly connected to the third fiber.

32. An apparatus as in claim 29, further comprising:
a pump light source providing the pump light; and
an enclosure enclosing the pump light source and the third fiber.

33. An apparatus as in claim 29, further comprising:
a pump light source providing the pump light;
an optical amplifier amplifying the optical signal after being output from the output end of the third fiber; and
an enclosure enclosing the pump light source, the optical amplifier and the third fiber.

34. An apparatus as in claim 29, wherein the Raman amplification occurring in the second fiber substantially equalizes transmission loss in the second fiber.

35. An apparatus as in claim 29, wherein the pump light travels through the third fiber, the second fiber and into the first fiber.

36. An apparatus as in claim 29, wherein the third fiber is shorter than the second fiber, and the second fiber is shorter than the first fiber.

37. An apparatus as in claim 30, wherein the first fiber is directly connected to the second fiber, and the second fiber is directly connected to the third fiber.

38. An apparatus as in claim 30, further comprising:
a pump light source providing the pump light; and
an enclosure enclosing the pump light source and the third fiber.

39. An apparatus as in claim 30, further comprising:
a pump light source providing the pump light;
an optical amplifier amplifying the optical signal after being output from the output end of the third fiber; and
an enclosure enclosing the pump light source, the optical amplifier and the third fiber.

40. An apparatus as in claim 30, wherein the Raman amplification occurring in the second fiber substantially equalizes transmission loss in the second fiber.

41. An apparatus as in claim 32, wherein the first and second fibers are outside of the enclosure.

42. An apparatus as in claim 32, wherein the Raman amplification occurring in the second fiber substantially equalizes transmission loss in the second fiber.

43. An apparatus as in claim 33, wherein the Raman amplification occurring in the second fiber substantially equalizes transmission loss in the second fiber.

44. An apparatus as in claim 33, wherein the first and second fibers are outside of the enclosure.

45. An apparatus as in claim 38, wherein the first and second fibers are outside of the enclosure.

46. An apparatus as in claim 38, wherein the Raman amplification occurring in the second fiber substantially equalizes transmission loss in the second fiber.

47. An apparatus as in claim 39, wherein the first and second fibers are outside of the enclosure.

48. An apparatus as in claim 39, wherein the Raman amplification occurring in the second fiber substantially equalizes transmission loss in the second fiber.

49. An apparatus as in claim 41, wherein the Raman amplification occurring in the second fiber substantially equalizes transmission loss in the second fiber.

50. An apparatus as in claim 44, wherein the Raman amplification occurring in the second fiber substantially equalizes transmission loss in the second fiber.

51. An apparatus as in claim 45, wherein the Raman amplification occurring in the second fiber substantially equalizes transmission loss in the second fiber.

52. An apparatus as in claim 47, wherein the Raman amplification occurring in the second fiber substantially equalizes transmission loss in the second fiber.

53. An apparatus comprising:
a Raman amplification medium provided with pump light so that an optical signal is Raman amplified as the optical signal travels through the Raman amplification medium, the Raman amplification medium having characteristics so that dispersion slope of the Raman amplification medium is substantially zero and total wavelength dispersion over the entire length of the Raman amplification medium is not zero for a wavelength of the optical signal,
wherein the Raman amplification medium comprises:
a first fiber provided with pump light from a first pump light source to cause Raman amplification to occur in the first fiber, and
a second fiber provided with pump light from a second pump light source different from the first pump light source, to cause Raman amplification to occur in the second fiber, the optical signal traveling through the first fiber and then through the second fiber to thereby travel through the Raman amplification medium.

54. An apparatus as in claim 53, wherein the first fiber has one of a positive dispersion and a negative dispersion for the wavelength of the optical signal, and the second fiber has the other of said one of a positive dispersion and a negative dispersion for the wavelength of the optical signal.

55. An apparatus as in claim 53, wherein the first and second fibers both have a smaller mode field diameter than that of a transmission line through which the optical signal travels.

56. An apparatus as in claim 54, wherein the first and second fibers both have a smaller mode field diameter than that of a transmission line through which the optical signal travels.

57. An apparatus comprising:
a first optical amplifier comprising an optical fiber provided with pump light so that an optical signal traveling through the optical fiber is amplified by Raman amplification and then output from the first optical amplifier, the optical fiber having a positive dispersion per fiber length for a wavelength of the optical signal; and
a second optical amplifier amplifying the optical signal output from the first optical amplifier, the second optical amplifier comprising an optical fiber provided with pump light so that the optical signal travels through the optical fiber of the second optical amplifier and is thereby amplified by Raman amplification, the optical fiber of the second optical amplifier having a negative dispersion per fiber length for the wavelength of the optical signal,
wherein the optical fiber of the first optical amplifier and the optical fiber of the second optical amplifier, taken together, have characteristics so that dispersion slope of the optical fibers, taken together, is substantially zero and total wavelength dispersion over the entire length of the optical fibers, taken together, is not zero for a wavelength of the optical signal.

58. An apparatus comprising:
a first optical amplifier comprising an optical fiber provided with pump light so that an optical signal traveling through the optical fiber is amplified by Raman amplification and then output from the first optical amplifier, the optical fiber having one of a positive dispersion per fiber length for a wavelength of the optical signal and a negative dispersion per fiber length for the wavelength of the optical signal; and
a second optical amplifier amplifying the optical signal output from the first optical amplifier, the second optical amplifier comprising an optical fiber provided with pump light so that the optical signal travels through the optical fiber and is thereby amplified by Raman amplification, the optical fiber having the other of said one of a positive dispersion per fiber length for the wavelength of the optical signal and a negative dispersion per fiber length for the wavelength of the optical signal,
wherein the optical fiber of the first optical amplifier and the optical fiber of the second optical amplifier, taken together, have characteristics so that dispersion slope of the optical fibers, taken together, is substantially zero and total wavelength dispersion over the entire length of the optical fibers, taken together, is not zero for a wavelength of the optical signal.

59. An apparatus comprising:
an optical transmission line including first, second and third fibers so that an optical signal travels through the transmission line from the first fiber, then through the second fiber and then through the third fiber to be output from an output end of the third fiber, the first fiber having a positive dispersion for a wavelength of the optical signal, the second fiber having a negative dispersion for the wavelength of the optical signal and a mode field diameter smaller than a mode field diameter of the first fiber, the third fiber having a mode field diameter smaller than the mode field diameter of the second fiber, pump light being provided to the third fiber from the output end so that the pump light travels through the transmission line in an opposite direction than the optical signal and causes Raman amplification to occur in the transmission line, wherein
the third fiber is shorter than the second fiber, and the second fiber is shorter than the first fiber,
the Raman amplification occurring in the second fiber substantially equalizes transmission loss in the second fiber, and
Raman gain occurring in the third fiber is greater than Raman gain occurring in the second fiber.

* * * * *

UNITED STATES PATENT AND TRADEMARK OFFICE
CERTIFICATE OF CORRECTION

PATENT NO. : 7,034,991 B2
APPLICATION NO. : 09/970982
DATED : April 25, 2006
INVENTOR(S) : Takao Naito et al.

It is certified that error appears in the above-identified patent and that said Letters Patent is hereby corrected as shown below:

On the cover page, (56) Reference Cited, U.S. Patent Documents, column 2, line 5, change "2002/0121132" to --2002/0131132--

Signed and Sealed this

Eighth Day of August, 2006

JON W. DUDAS
*Director of the United States Patent and Trademark Office*